Figure 1:
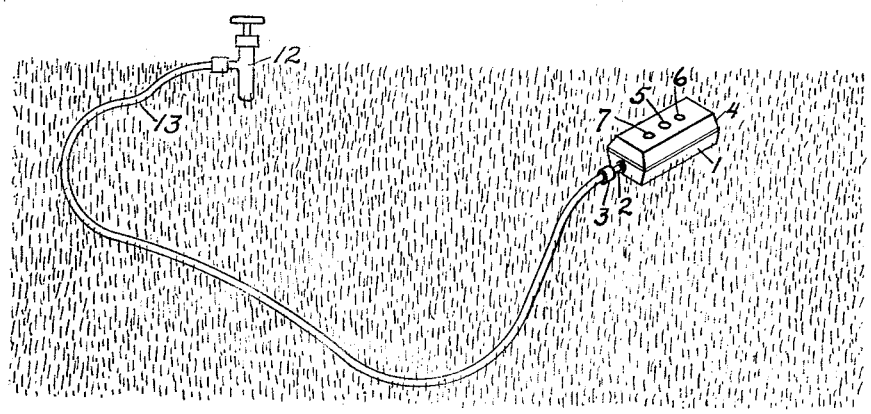

Sept. 10, 1940.    J. DE FREITAS    2,213,955
PRESSURE REDUCING DEVICE
Filed March 15, 1939

Inventor
Joseph de Freitas
By  
Attorney

Patented Sept. 10, 1940

2,213,955

UNITED STATES PATENT OFFICE 2,213,955

PRESSURE REDUCING DEVICE

Joseph de Freitas, Alameda, Calif.

Application March 15, 1939, Serial No. 261,905

1 Claim. (Cl. 299—107)

(Granted under the act of March 3, 1883, as amended April 30, 1928; 370 O. G. 757)

This invention relates generally to a fluid pressure reducing apparatus, but more particularly to an irrigating device for watering lawns and plants, the device being so constructed that it may be connected to the ordinary garden hose.

One object of the invention is to provide a device which will reduce the force of the flow from the supply conduit without diminishing the volume of the water emitted to the soil or plants.

Another object of the invention is to provide a watering device of the class described which is of simple and inexpensive construction, and one which may be easily attached to the ordinary garden hose.

Figure 2:
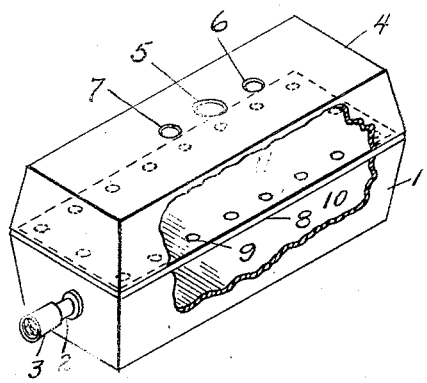

Referring more particularly to the accompanying drawing in which corresponding parts are indicated by similar reference characters:

Fig. 1 is a perspective view, showing the device connected to a hydrant by the usual type of rubber hose; and Fig. 2 is a perspective view of the device, partially broken away to show the upper and lower chambers, and the location of the intermediate perforated baffle plate.

The irrigating device which forms the subject matter of this invention comprises three main parts: a trough 1 provided with a flanged inlet tube 2 having a hose connection 3; a cover 4 provided with one large outlet opening 5, and two smaller outlet openings 6 and 7, and a baffle plate 8 provided with a series of openings 9 adjacent its perimeter, said baffle plate being located intermediate the trough and the cover.

The three principal elements comprising the irrigating device, namely, the trough 1, the cover 4, and the baffle plate 8, are either soldered or otherwise suitably attached to each other along their contacting edges to form a casing having a centrally located perforated partition.

The trough 1 and the cover 4 form respectively lower and upper chambers 10 and 11, which are separated by the intermediate perforated dividing wall or baffle plate 8.

In the operation of the device, water from a hydrant 12 is supplied to the lower chamber 10 through the ordinary garden hose 13, attached to the hose connection 3 of the trough 1. After entering the chamber 10, the pressure of the stream is reduced by spreading and contact with the perforated baffle plate. The water from the chamber 10 therefore passes through the openings 9 into the upper chamber 11 at a reduced pressure. On entering the upper chamber 11 the pressure of the water is again reduced by spreading within the chamber 11 and by contact with the top of said chamber. The top of chamber 11 which is provided with openings 5, 6, and 7 functions as a second baffle plate which serves to further reduce the pressure of the water.

The total area of the perforations 9 in the baffle plate 8 is of sufficient extent so as to preclude increase in pressure of the water flowing from the lower chamber 10 to the upper chamber 11, and the total area of the openings 5, 6, and 7 in the top of the cover is of sufficient extent so as to prevent increase in the pressure of the water flowing to the exterior of the casing.

By properly proportioning the size of each chamber, the size of the baffle plate, the perforations in the baffle plate, and the openings in the cover, the water which passes through the apparatus is reduced in pressure, and is emitted from the exit openings 5, 6, and 7, in a non-spraying even flow which trickles from the casing to the surrounding soil, thus preventing any injury to plant life in the vicinity which might be caused by impact with a spraying stream.

Although in the foregoing description the device has been set forth as primarily adapted for irrigation purposes, it is evident that it could also be used for disseminating gas, and in this event the intermediate perforated baffle plate would function as a gas pressure reducing means.

Having described my invention, what I claim as new and wish to secure by Letters Patent is:

An irrigating device comprising a lower member including a bottom section and upwardly and outwardly extending plane surfaced side and end walls, said bottom section and walls defining a hollow trough-shaped admission chamber, a perforated baffle plate attached to the edges of said upwardly and outwardly extending walls, an upper member having a perforated top section and downwardly and outwardly extending plane surfaced side and end walls forming a hollow inverted trough-shaped exhaust chamber, the edges of said downwardly extending walls being fastened to the edges of said baffle plate, the perforations in said top member being out of alignment with those of said baffle plate, whereby to prevent the direct flow of water from the admission chamber through the orifices in the exhaust chamber.

JOSEPH DE FREITAS.